United States Patent [19]

Hopper

[11] 4,085,093
[45] Apr. 18, 1978

[54] SULFILIMINES AS PREMATURE VULCANIZATION INHIBITORS

[75] Inventor: Roger J. Hopper, Akron, Ohio

[73] Assignee: The Goodyear Tire & Rubber Company, Akron, Ohio

[21] Appl. No.: 707,970

[22] Filed: Jul. 23, 1976

[51] Int. Cl.$^2$ ................ C07C 143/72; C07C 143/84; C08F 28/00
[52] U.S. Cl. .................... 260/79.5 P; 260/79.5 A; 260/79.5 B; 260/79.5 C; 260/556 A; 260/556 AR; 260/556 S; 260/780; 260/785; 260/786
[58] Field of Search ............... 260/79.5 P, 79.5 A, 260/79.5 C, 79.5 B, 785, 786, 780, 556 A, 556 AR, 556 S

[56] References Cited

U.S. PATENT DOCUMENTS

| 3,107,229 | 10/1963 | Malz et al. ................ 260/45.8 |
| 3,678,017 | 7/1972 | Shelton et al. ............. 260/79.5 A |
| 3,856,762 | 12/1974 | Hopper et al. ............. 260/79.5 P |
| 3,915,907 | 10/1975 | Hopper ...................... 260/79.5 C |
| 3,915,940 | 10/1975 | Kool ......................... 260/79.5 A |

OTHER PUBLICATIONS

K. Tsujihara et al., Bulletin of the Chemical Society of Japan, vol. 42, pp. 2631–2635, (1969).
F. E. Hardy, Journal of the Chemical Society (London), part C, pp. 2087–2089, (1970).
Chemical Abstracts, vol. 77, Chemical Substance Index, (P-Z), Dec. 31, 1972, pp. 3721C5–3722C5.
Chemical Abstracts, vol. 78, Chemical Substance Index (O-Z), Jun. 30, 1973, pp. 3833cs–3834cs.
Chemical Abstracts, vol. 79, Chemical Substance Index (J-Z), Dec. 31, 1973, p. 3475cs.
Chemical Abstracts, vol. 80, Chemical Substance Index (P-Z), Jun. 30, 1974, pp. 3717cs–3718cs.
Chemical Abstracts, vol. 81, Chemical Substance Index (P-Z), Dec. 31, 1974, pp. 4006cs–4007cs.
Chemical Abstracts, vol. 82, Chemical Substance Index (Pep-Z), Jun. 30, 1975, pp. 4142cs–4143cs.
Mann et al., Journal of the Chemical Society, London, vol. 121, 1922, pp. 1052–1055.

Primary Examiner—Ronald W. Griffin
Attorney, Agent, or Firm—F. W. Brunner; J. A. Rozmajzl

[57] ABSTRACT

N-sulfonyl-sulfilimine compounds such as S,S-di(isopropyl)-N-(p-toluenesulfonyl) sulfilimine are used as premature vulcanization inhibitors in polymers compounded for sulfur vulcanization.

7 Claims, No Drawings

SULFILIMINES AS PREMATURE VULCANIZATION INHIBITORS

This invention relates to an improved vulcanizing process for rubber and to the rubber stocks obtained by using this improved process. The invention also relates to new compounds useful as inhibitors of premature vulcanization in rubber. More particularly, the invention relates to a method for preventing the premature vulcanization of rubber stocks and to the rubber stocks obtained by using this method.

Scorching during the processing of rubber is due to the premature or incipient vulcanization which may occur during any of the steps involved in the processing prior to the final vulcanization step, or during storage between said processing steps. Whereas a properly compounded unscorched rubber formulation can be die-extruded or sheeted from a calendar smoothly and without lumping, a scorched material often becomes wavy and lumpy after extrusion or sheeting, and must be discarded.

An object of the present invention is to provide a method of inhibiting premature vulcanization of rubber. Another object of the present invention is to provide scorch inhibitors and retarders for use in rubber processing. Other objects will become apparent as the description proceeds.

The objects of the present invention are accomplished by a sulfur vulcanizable combination of a sulfur vulcanizable rubber and at least one compound containing the N-sulfonyl-sulfilimine moiety, i.e.

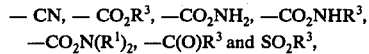

said compound being selected from the group consisting of

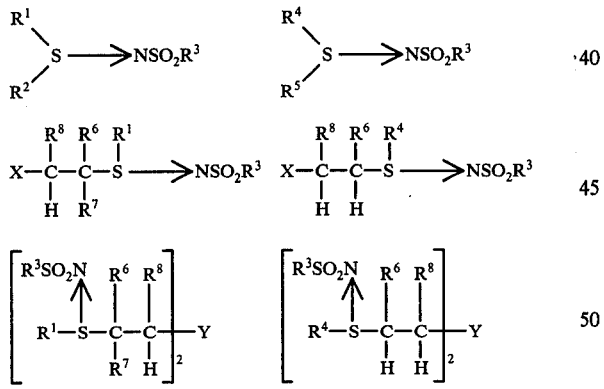

wherein $R^1$ is selected from the group consisting of primary alkyl radicals (1–20 carbon atoms), secondary alkyl radicals (3–20 carbon atoms), cycloalkyl radicals (5–20 carbon atoms), aralkyl radicals (7–20 carbon atoms), and aryl radicals (6–20 carbon atoms), said aralkyl and aryl radicals being optionally substituted on the ring by one or two alkyl (1–4 carbon atoms), alkoxy (1–4 carbon atoms), halo (such as chloro) or nitro groups, wherein $R^2$ is selected from the group consisting of primary alkyl radicals (2–20 carbon atoms), secondary alkyl radicals (3–20 carbon atoms), tertiary alkyl radicals (4–20 carbon atoms) and cycloalkyl radicals (5–20 carbon atoms), wherein $R^3$ and $R^4$ are selected from the group consisting of the radicals for $R^1$ and tertiary alkyl radicals (4–20 carbon atoms), wherein $R^5$ is selected from the group consisting of primary alkyl radicals (2–20 carbon atoms), secondary alkyl radicals (3–20 carbon atoms), and cycloalkyl radicals (5–20 carbon atoms) wherein $R^6$, $R^7$, and $R^8$ are selected from the group consisting of hydrogen and primary alkyl radicals (1–4 carbon atoms), wherein X is selected from the group consisting of $$-CN, -CO_2R^3, -CO_2NH_2, -CO_2NHR^3,$$
$$-CO_2N(R^1)_2, -C(O)R^3 \text{ and } SO_2R^3,$$

and wherein Y is selected from the group consisting of —C(O)— and —SO$_2$— radicals.

Preferred compounds are those wherein $R^1$ is selected from the group consisting of primary alkyl radicals (2–13 carbon atoms), secondary alkyl radicals (3–12 carbon atoms), cyclohexyl and phenyl, wherein $R^2$ is selected from the group consisting of secondary alkyl radicals (3–12 carbon atoms), tertiary alkyl radicals (4–12 carbon atoms) and cyclohexyl, wherein $R^3$ is selected from the group consisting of primary alkyl radicals (1–12 carbon atoms), secondary alkyl radicals (3–12 carbon atoms), tertiary alkyl radicals (4–12 carbon atoms), cyclohexyl, phenyl, p-chlorophenyl, p-tolyl, and p-nitrophenyl and wherein $R^6$, $R^7$, and $R^8$ are hydrogen, and wherein X is —CN, —CO$_2$CH$_3$ or —CO$_2$CH$_2$CH$_3$ and wherein Y is —SO$_2$—.

The following compounds illustrate, but do not limit the sulfilimines of the present invention:
S,S-di(isopropyl)-N-(ethanesulfonyl)-sulfilimine,
S,S-di(isopropyl)-N-(o-toluenesulfonyl)-sulfilimine,
S,S-di(isopropyl)-N-(1-hexadecanesulfonyl)-sulfilimine,
S-(n-octyl)-S-(isopropyl)-N-(p-toluenesulfonyl)-sulfilimine,
S-(t-butyl)-S-(n-propyl)-N-(p-chlorobenzenesulfonyl)-sulfilimine,
S-(n-dodecyl)-S-cyclohexyl-N-(p-nitrobenzenesulfonyl)-sulfilimine,
S,S-di(2-hexyl)-N-(p-toluenesulfonyl)-sulfilimine,
S-isopropyl-S-(2-carbomethoxypropyl)-N-(p-toluenesulfonyl)-sulfilimine,
S-isopropyl-S-(2-cyanoethyl)-N-(p-toluenesulfonyl-sulfilimine),
S-cyclohexyl-S-(1,1-dimethyl-2-acetylethyl)-N-(benzenesulfonyl)-sulfilimine,
S-cyclohexyl-S-(2-carbamylpropyl)-N-(p-toluenesulfonyl)-sulfilimine,
S-cyclohexyl-S-[2-(t-butylcarbamyl)-ethyl]-N-(p-toluenesulfonyl)-sulfilimine,
S-(p-chlorophenyl)-S-[2-(dimethylcarbamyl)ethyl]-N-(p-methoxybenzenesulfonyl)-sulfilimine,
S-(n-hexyl)-S-(2-carbophenoxyethyl)-N-(p-toluenesulfonyl)sulfilimine,
S-(isopropyl)-S-(1-methyl-2-carboethoxyethyl)-N-(p-toluenesulfonyl)-sulfilimine,
S-(2-dodecyl)-S-(2-carbomethoxyethyl)-N-(p-toluenesulfonyl)sulfilimine,
S-cyclohexyl-S-(2-carboisopropoxyethyl)-N-(o-chlorobenzenesulfonyl)-sulfilimine,
S-(o-tolyl)-S-(2-cyanoethyl)-N-(p-chlorobenzenesulfonyl)sulfilimine,
S,S'-dibenzyl-N,N'-di-(p-chlorobenzenesulfonyl)-S,S'-(3-oxopentamethylene)-bis(sulfilimine),
S,S'-di-(isopropyl)-N,N'-di(benzenesulfonyl)-S,S'-(3-dioxythiapentamethylene)-bis(sulfilimine), S,S'-diphenyl-N,N'-di(p-toluenesulfonyl)-S,S'-(3-dioxythiapentamethylene)-bis(sulfilimine),
S-benzyl-S-(2-methyl-2-carbophenoxyethyl)-N-(p-nitrobenzenesulfonyl)-sulfilimine,
S-(p-tolyl)-S-isopropyl-N-(cyclohexanesulfonyl)-sulfilimine,
S,S-di(2-dodecyl)-N-(propanesulfonyl)-sulfilimine,
S,S-di(isopropyl)-N-(1-dodecanesulfonyl)-sulfilimine,
S-isopropyl-S-(2-methyl-2-cyanoethyl)-N-(α-toluenesulfonyl)sulfilimine.

The essential feature of the retarders of the present invention is an N-sulfonyl sulfilimine moiety wherein the sulfilimine sulfur possesses at least one substituent with at least one aliphatic hydrogen in the β position, i.e.

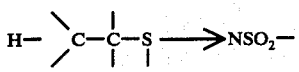

It will be apparent to those skilled in the art, that such a moiety may be incorporated into additional, more complex structures than those specified above, e.g.

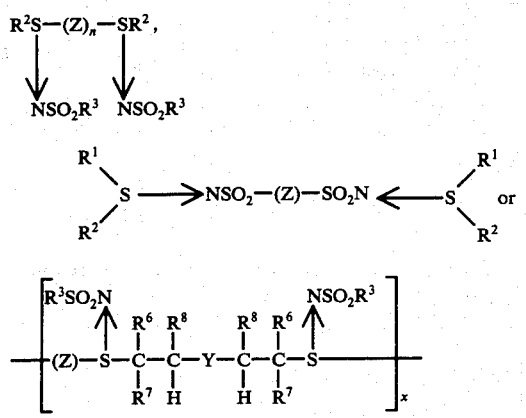

wherein the R's and Y are as described previously, and Z is a divalent radical such as alkylene or arylene. Such compounds would offer no practical benefit as compared to structurally less complex sulfilimines.

This invention is applicable to rubber mixes containing sulfur-vulcanizing agents, organic accelerators for vulcanization and antidegradants, neither being the inhibitor used. For the purposes of this invention, sulfur-vulcanizing agent means elemental sulfur or sulfur donating vulcanizing agents, for example, an amine disulfide or a polymeric polysulfide. The invention is applicable to vulcanization accelerators of various classes. For example, rubber mixes containing the aromatic thiazole accelerators which include N-cyclohexyl-2-benzothiazole sulfenamide, 2,2'-dithiobis(benzothiazole), 2-mercaptobenzothiazole, N-tert-butyl-2-benzothiazole sulfenamide, 2-benzothiazolyl diethyldithiocarbamate and 2-(morpholinothio) benzothiazole can be used. Other thiazole accelerators which may be used include 2-(aminodithio)-thiazoles and 2-(aminotrithio)-thiazoles such as 2-(morpholinodithio)-benzothiazole. Amine salts of mercaptobenzothiazole accelerators, for example, the t-butyl amine salt of mercaptobenzothiazole, and like salts of morpholine and 2,6-dimethyl morpholine can be used in the invention. Thiazole accelerators other than aromatic can be used. Stocks containing secondary accelerators, for example, tetraalkylthiuram disulfides or monosulfides such as tetramethylthiuram disulfide, and tetramethylthiuram monosulfide, salts of dithiocarbamic acids such as dialkyldithiocarbamic acids, for example, zinc dimethyldithio carbamate, thiocarbamylsulfenamides, and guanidine derivatives such as diaryl guanidines, such as diphenyl guanidine or di-o-tolyl guanidine are improved using the process of our invention.

The inhibitors of the invention can be used in any sulfur vulcanizable rubber including natural rubber, synthetic rubbers and mixtures thereof. Synthetic rubbers that can profit by the practice of the present invention include butyl rubber, homopolymers of conjugated 1,3-diene monomer such as 1,3-butadiene or isoprene, e.g., cis-1,4-polybutadiene (a cis-1,4 content in excess of 30 percent, preferably in excess of 85 percent) and cis-1,4 polyisoprene (a cis-1,4 content in excess of 80 percent), copolymers of conjugated 1,3-diene monomer with other monomers, for example, styrene, acrylonitrile, isobutylene and methyl methacrylate. Ethylene propylene terpolymer, for example, ethylene, propylene dicyclopentadiene terpolymers can also benefit from the present invention, as can rubbers derived from ring opening polymerization of cycloolefins, e.g. polypentenamer.

Retarders of the present invention can be prepared by reaction of an N-sodio-N-chlorosulfonamide with an appropriate sulfide, e.g.

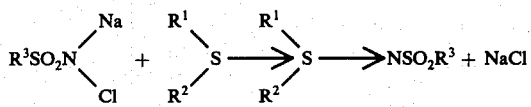

Such preparations, wherein $R^1$ and $R^2$ are hydrocarbon radicals, are well documented in the literature [see K. Tsujihara et al., Bulletin of the Chemical Society of Japan, Vol. 42, pp. 2631–2635 (1969) and F. E. Hardy, Journal of the Chemical Society (London), part C, pp. 2087–2089 (1970)]. Sulfilimines containing X or Y radicals (as illustrated previously), while apparently not previously reported, may be prepared by essentially the same procedures. Other methods for sulfilimine preparation also appear in the prior art, e.g. by reaction of a sulfoxide with a sulfonamide under dehygrating conditions [see D. S. Tarbell and C. Weaver, Journal of the American Chemical Society, Vol. 63, pp. 2939 - 2942 (1941)]. The performance of the compounds of the present invention as retarders is, however, independent of their method of preparation.

The following Examples I-IV illustrate the preparation of retarders which may be used within the practice of the present invention. Subsequent examples illustrate additional retarders and their use in rubber. The examples are intended to illustrate, but not limit, the practice of the present invention.

EXAMPLE I

To prepare S,S-di(isopropyl)-N-(p-toluenesulfonyl)-sulfilimine, 23.64 grams of isopropyl sulfide was added to a stirred suspension of 60 grams of N-sodio-N-chloro-p-toluenesulfonamide.3H$_2$O in 90 milliliters of isopropyl alcohol. The addition was carried out over a 9 minute period while allowing the temperature to rise spontaneously from 20° to 44° C. The reaction mixture was stirred an additional 10 minutes, then slowly mixed with 320 milliliters H₂O to which was added 3 milliliters of 2.2 M aqueous sodium hypochlorite. The resulting white crystalline precipitate was filtered, washed with water, filtered and dried to yield 50.8 grams (88% yield) m.p. 115°–117° C., with decomposition as indicted by formation of bubbles during melting. The melting point reported in the previously cited Tsujihara reference was 117°–118° C.

EXAMPLE II

To prepare S-cyclohexyl-S-(2-carboethoxyethyl)-N-(p-toluenesulfonyl)-sulfilimine, 8.9 grams of ethyl-3-(cyclohexylthio) propionate was added to a stirred solution of 11.55 grams of N-sodio-N-chloro-(p-toluenesulfonamide).3H₂O in 200 milliliters of ethanol. The addition was carried out over 3 minutes at 20° C., after which the temperature rose spontaneously. The mixture was cooled to hold the temperature below 30° C., then stirred 30 minutes at 20°–25° C., and concentrated under vacuum to half its original volume. Water was then slowly stirred in to bring the total volume to 600 milliliters. During the addition of water, the initial precipitate (NaCl) dissolved, after which the product precipitated. This was filtered, washed with water, filtered, and dried to yield 13.4 grams (84% yield) of white crystals, m.p. 99°–101° C. Recrystallization from ethanol gave m.p. 101°–102.5° C. Analysis of the recrystallized material showed 56.50% carbon, 7.20% hydrogen, 3.65% nitrogen and 16.68% sulfur. Calculated percentages are 56.07% carbon, 7.06% hydrogen, 3.63% nitrogen and 16.63% sulfur. The infrared and proton magnetic resonance spectra were consistent with the proposed structure.

EXAMPLE III

To prepare S,S'-di(cyclohexyl)-N,N'-di(p-toluenesulfonyl)-S,S'-(3-dioxythiapentamethylene)-bis(sulfilimine), a solution of 18.03 grams of N-sodio-N-chloro-(p-toluenesulfonamide).3H₂O in 100 milliliters methanol was added at 35°–40° C. to a stirred solution of 10.52 grams of di(2-cyclohexylthioethyl) sulfone in 100 milliliters of methanol over a 10 minute period. After the addition, the mixture was stirred 2 hours without heating. During this period, a thick precipitate developed, and 25 milliliters additional methanol was added to facilitate stirring. The product was mixed with 400 milliliters H₂O, filtered, washed with water and methanol, filtered, and dried to yield 17.8 grams (86% yield) of white powder, m.p. 90°–94° C. Recrystallization from methanol gave m.p. 93.5°–95° C. Analysis of the recrystallized material showed 4.14% nitrogen. The calculated percentage was 4.07% nitrogen.

EXAMPLE IV

To prepare S,S-diisopropyl-N-methanesulfonyl sulfilimine, 9.51 grams of methanesulfonamide was added portionwise over 5 minutes at less than 25° C. to 49 milliliters of 2.04 M aqueous sodium hypochlorite solution. Free sodium hydroxide ca. 8 mmol., was neutralized by addition of 0.4 gram H₂SO₄ in 10 milliliters H₂O. This was reacted with a solution of 11.8 grams isopropyl sulfide and 0.1 gram tetrabutylammonium bromide in 70 milliliters dichloromethane, allowing the temperature to rise to reflux (42° C.). After 5 minutes, the dichloromethane layer was separated, washed with H₂O, and dried over anhydrous sodium sulfate. The solution was concentrated under vacuum and the resulting residue washed with diethyl ether, filtered, and dried to yield 5.5 grams of white solid, m.p. 74.5°–77° C. The proton magnetic resonance spectrum (solution in CDCl₃, tetramethyl silane internal reference) showed a doublet (J=6.2Hz) at δ 1.41 arising from the 12 methyl protons of the isopropyl groups, a singlet at δ 2.91 from the 3 protons of the sulfonyl methyl group, and a septet (J=6.2 Hz) at δ 3.18 due to the two isopropyl methine protons. Analysis of a recrystallized (benzenehexane) sample showed 39.76% carbon, 7.88% hydrogen, 6.71% nitrogen, and 30.64% sulfur. Calculated percentages are 39.78% carbon, 8.11% hydrogen, 6.62% nitrogen and 30.34% sulfur.

EXAMPLE V

The following were prepared by procedures similar to those described in Examples I – III.

| Retarder No. | Compound | m.p., ° C. |
| --- | --- | --- |
| 1 | S-(tert-butyl)-S-(2-carbomethoxyethyl)-N-(p-toluenesulfonyl)-sulfilimine | 114–115 |
| 2 | S-phenyl-S-(2-cyanoethyl)-N-(p-chlorobenzenesulfonyl)-sulfilimine | 102–103 |
| 3 | S,S-di-(isopropyl)-N-(p-chlorobenzenesulfonyl)-sulfilimine | 129–131 |
| 4 | S,S-di(cyclohexyl)-N-(p-toluenesulfonyl)-sulfilimine | 113–116 |
| 5 | S-cyclohexyl-S-(2-carbomethoxyethyl)-N-benzenesulfonyl)-sulfilimine | 66–68.5 |
| 6 | S,S'-di(cyclohexyl)-N,N'-di-(benzenesulfonyl)-S,S'-(3-dioxythiapentamethylene)-bis(sulfilimine) | 110–113 |
| 7 | S-cyclohexyl-S-(2-carbomethoxyethyl)-N-(p-toluenesulfonyl) sulfilimine | 92–95 |
| 8 | S,S-di(isopropyl)-N-(benzenesulfonyl)-sulfilimine | 108–109.5 |
| 9 | S,S-di(sec-butyl)-N-(p-toluenesulfonyl)-sulfilimine, mixed stereo isomers | 45–69 |
| 10 | S-isopropyl-S-(n-propyl)-N-(p-toluenesulfonyl)-sulfilimine | 106–108 |
| 11 | S-(n-butyl)-S-(2-acetylethyl)-N-(p-toluenesulfonyl)-sulfilimine | 85.5–87 |
| 12 | S-(n-propyl)-S-(2-cyanoethyl)-N-(p-toluenesulfonyl)-sulfilimine | 115–116 |
| 13 | S-(n-butyl)-S-(2-carbomethoxyethyl)-N-(p-toluenesulfonyl)-sulfilimine | 111–112 |
| 14 | S,S'-di(ethyl)-N,N'-di(p-toluenesulfonyl)-S,S'-(3-oxopentamethylene)-bis-(sulfilimine) | 109–113 |
| 15 | S-(n-hexyl)-S-(2-carbomethoxyethyl)-N-(p-toluenesulfonyl)-sulfilimine | 80–84.5 |
| 16 | S-(cyclohexyl)-S-(2-carbamylethyl)-N- | |

-continued

| Retarder No. | Compound | m.p., °C. |
|---|---|---|
| 17 | (p-toluenesulfonyl)-sulfilimine S-(cyclohexyl)-S-(1,1-dimethyl-2-acetylethyl)-N-(p-toluenesulfonyl)-sulfilimine | — |
| 18 | S,S-di(n-butyl)-N-(p-toluenesulfonyl) sulfilimine | 74–77 |
| 19 | S-cyclohexyl-S-(2-methyl-2-carbomethoxyethyl)-N-(p-toluenesulfonyl)-sulfilimine | — |
| 20 | S-cyclohexyl-S-(2-cyanoethyl)-N-(p-toluenesulfonyl)-sulfilimine | — |
| 21 | S-benzyl-S-(2-carbomethoxyethyl)-N-(p-toluenesulfonyl)-sulfilimine | 95–98 |
| 22 | S-isopropyl-S-(2-carbomethoxyethyl)-N-(p-toluenesulfonyl)-sulfilimine | 105–106 |
| 23 | S-phenyl-S-(2-carbomethoxyethyl)-N-(p-toluenesulfonyl)-sulfilimine | 89–91 |

Tables I – VII illustrate the use of the sulfilimines of the present invention as retarders in different rubber stocks. The compositions are intended only to be illustrative of the practice of the present invention and not limiting. Mooney scorch tests were performed using the large rotor as described in ASTM D1646-61. A recorder was employed to continuously plot viscosity vs. time. The number of minutes required for the viscosity curve to rise 1 or 5 points above the minimum ($t\Delta 1$, $t\Delta 5$ respectively) was taken as a measure of scorch inhibition. The larger the value for $t\Delta 1$ or $t\Delta 5$, the greater the resistance to scorch (premature vulcanization).

Additional data on scorch delay and vulcanizing characteristics were obtained with a Monsanto Oscillating Disc Rheometer as described by Decker, Wise and Guerry in "Rubber World", page 68, December, 1962. Pertinent data from this instrument are: $t_4$, the minutes required for the Rheometer torque curve to rise 4 units (in.-lb.) above the minimum torque value (a measure of scorch delay), and $t_{90\%}$, the minutes required for the torque curve to reach 90 percent of the difference between the maximum and minimum torque values defined by the curve. The value, $t_{90\%}$, is considered to be the time required to reach the optimum vulcanized state.

The difference $(t_{90\%} - t_4)$ is indicative of the time necessary for actual vulcanization to take place after the scorch delay period has ended, i.e., is a relative measure of vulcanization rate. Retarders which increase $t_4$, but do not greatly increase $(t_{90\%} - t_4)$ are preferred since these impart processing safety, yet do not require greatly extended vulcanization times.

The difference between the maximum and minimum torque obtained on the Rheometer curve, $\Delta$ Torque, in inch-pounds, is taken as a measure of the degree (state) of vulcanization.

The tensile strength, elongation and 300% modulus were obtained according to standard test procedures wherein dumbell samples were died from vulcanized sheets and tested in a conventional tensile tester. This procedure is more fully described in "New Autographic Machine for Testing Tensile Properties of Rubber" by G. J. Albertoni, Industrial and Engineering Chemistry, Analytical Edition, Vol. 3, p. 236, 1931. Test stocks were vulcanized for $t_{90\%}$ minutes as determined from the Rheometer curves.

Various base stocks are shown in Table I. These stocks were compounded with sulfur, various accelerator and retarder systems and various additives. Rheometer, stress/strain and Mooney data for these stocks are described in Tables II-VII. All parts are parts by weight.

Table I

| Composition of Base Stocks | | | |
|---|---|---|---|
| Component, parts by wt. | A | B | C |
| Natural Rubber | 100.0 | | 10.0 |
| SBR-1712 | | 137.5 | |
| Cis-1,4-polybutadiene | | | 90.0 |
| HAF Carbon Black | 50.0 | | |
| ISAF Carbon Black | | 68.0 | 50.0 |
| Processing Oil | 3.0 | | 10.0 |
| Arylene Diamine Antioxidant | 1.0 | 0.5 | 1.0 |
| Stearic Acid | 3.0 | 1.5 | 3.0 |
| Zinc Oxide | 3.0 | 3.0 | 3.0 |
| Sulfur | 2.5 | — | 2.5 |

Retarders of the present invention were evaluated in Stock A (162.5 parts) using 0.5 parts of 2-(4-morpholinothio)benzothiazole as accelerator, and 0.6 part retarder. A Model R-100 Rheometer at 100 cycles per minute was used. Results are summarized in Table II.

Table II

| | Retarder No. | | | | |
|---|---|---|---|---|---|
| | None | Ex.I | 8 | 7 | 6 |
| Rheometer at 135° C. | | | | | |
| $t_4$ | 16.0 | 34.2 | 36.5 | 34.0 | 34.8 |
| $t_{90\%}$ | 46.0 | 68.0 | 69.9 | 70.5 | 73.7 |
| $(t_{90\%} - t_4)$ | 30.0 | 33.8 | 33.4 | 36.5 | 38.9 |
| $\Delta$Torque | 55.8 | 58.9 | 53.3 | 53.0 | 52.2 |
| Mooney Scorch at 132° C. | | | | | |
| $t\Delta 5$ | 10.5 | 22.7 | 24.8 | 21.5 | 23.6 |
| Stress/Strain Data (Vulcanized $t_{90\%}$ at 135° C.) | | | | | |
| Tensile Strength, MPa | 26.5 | 27.1 | 26.6 | 26.1 | 25.2 |
| Elongation, % | 525 | 510 | 520 | 510 | 510 |
| 300% Modulus, MPa | 14.2 | 15.6 | 14.3 | 14.2 | 13.5 |

Additional retarders were evaluated under the same conditions (162.5 parts Stock A, 0.5 part 2-(4-morpholinothio)-benzothiazole, 0.6 part retarder, Model R-100, 100 cycles, 135° C.) described for Table II. Improved scorch is indicated by $t_4$ values of stocks with retarders, divided by the $t_4$ value if the control (same stock without retarder). When this ratio, $t_4/t_{4c}$, is greater than 1, the test compound is a retarder. Results are shown in Table III.

Table III

| Retarder No. | $t_4/t_{4c}$ | Retarder No. | $t_4/t_{4c}$ |
|---|---|---|---|
| 1 | 1.24 | 18 | 1.38 |
| 2 | 1.53 | 19 | 1.82 |
| 3 | 2.13 | 20 | 1.79 |
| 4 | 2.01 | 21 | 1.37 |
| 5 | 2.13 | 22 | 1.94 |
| 9 | 2.28 | 23 | 1.53 |
| 16 | 1.82 | Ex. II | 2.11 |
| 17 | 1.50 | Ex. III | 2.16 |
| | | Ex. IV | 2.28 |

The sulfilimine retarders (0.6 parts) were evaluated in Stock A using 0.5 part N-(t-butyl)-2-benzothiazole sulfenamine as accelerator as shown in Table IV. Model LHS Rheometer at 300 cycles per minute was used.

TABLE IV

| | Retarder No. | | | | |
|---|---|---|---|---|---|
| | None | 13 | Ex. I | 15 | 12 |
| Rheometer at 135° C. | | | | | |
| $t_4$ | 12.3 | 17.0 | 25.7 | 16.8 | 17.0 |
| $t_{90\%}$ | 44.8 | 44.0 | 58.0 | 44.3 | 47.5 |
| $(t_{90\%}-t_4)$ | 32.5 | 27.0 | 32.3 | 27.5 | 30.5 |
| $\Delta$Torque | 68.6 | 68.5 | 66.8 | 68.8 | 69.4 |
| Mooney Scorch at 132° C. | | | | | |
| $t\Delta 5$ | 13.1 | 17.6 | 24.1 | 15.8 | 16.6 |
| Stress/Strain Data (Vulcanized $t_{90\%}$ at 135° C.) | | | | | |
| Tensile Strength, MPa | 27.0 | 24.6 | 25.7 | 25.8 | 26.1 |
| Elongation, % | 530 | 500 | 515 | 520 | 535 |
| 300% Modulus, MPa | 14.4 | 13.5 | 13.5 | 13.9 | 13.1 |

The retarders of the present invention are applicable to sulfur vulcanizable rubbers other than natural rubber, as illustrated by Tables V and VI. A Model R-100 Rheometer at 100 cycles/minute was used.

TABLE V

| 210.5 parts Base Stock B, 1.8 part Sulfur, 0.7 part 2-(4-morpholinothio)-benzothiazole, 0.8 part retarder | | | | | |
|---|---|---|---|---|---|
| | Retarder No. | | | | |
| | None | Ex. II | 11 | 14 | 10 |
| Rheometer at 149° C. | | | | | |
| $t_4$ | 13.3 | 21.5 | 19.8 | 19.0 | 19.9 |
| $t_{90\%}$ | 45.3 | 49.7 | 48.5 | 47.0 | 44.9 |
| $(t_{90\%}-t_{t4})$ | 32.0 | 28.2 | 28.7 | 28.0 | 25.0 |
| $\Delta$Torque | 35.2 | 34.3 | 34.2 | 34.9 | 35.0 |
| Mooney Scorch at 132° C. | | | | | |
| $t\Delta 1$ | 19.0 | >30 | >30 | >30 | >30 |

The retarders of Examples I and III as well as retarders 13 and 18 also demonstrated retarder activity in the above formulation.

The retarders of Examples I, II and III (0.8 part) also demonstrated retarding activity in 210.5 parts of Base Stock B using 1.8 parts sulfur and 0.7 part N-(cyclohexyl)-2-benzothiazole sulfenamide.

Retarder 10 and the retarders of Examples I and III demonstrated retarder activity in 210.5 parts of Base Stock B using 1.6 parts sulfur, 1.0 part retarder and 0.9 part 2-(4-morpholinodithio) benzothiazole.

Table VI

| 169.5 parts Base Stock C, 0.5 part N-(t-butyl)-2-benzothiazole sulfenamide | | | | |
|---|---|---|---|---|
| | Retarder No. | | | |
| Rheometer at 150° C. | None | 3 (0.6 part) | 3 (0.2 part) | 7 (0.6 part) |
| $t_4$ | 12.8 | 15.5 | 13.4 | 14.0 |
| $t_{90\%}$ | 34.6 | 45.6 | 38.0 | 44.1 |
| $(t_{90\%}-t_4)$ | 21.8 | 30.1 | 24.6 | 30.1 |
| $\Delta$Torque | 59.5 | 57.3 | 58.0 | 58.1 |
| Mooney Scorch at 132° C. | | | | |
| $t\Delta 5$ | 22.6 | 44.9 | 29.4 | 36.0 |
| Stress/Strain Data (Vulcanized $t_{90\%}$ at 150° C.) | | | | |
| Tensile Strength, MPa | 14.8 | 14.2 | 16.9 | 14.9 |
| Elongation, % | 425 | 410 | 480 | 430 |
| 300% Modulus, MPa | 8.5 | 8.6 | 8.2 | 8.4 |

Commercial rubber stocks often contain certain ancilliary additives which contribute to increased scorchiness. Examples include resorcinol/hexamethylenetetramine (a rubber-to-fabric adhesive system) and N,N'-bis(1-methylheptyl)-p-phenylenediamine (an antiozonant). As illustrated in Table VII, the inventive sulfilimines are of value in reducing the scorchiness of such stocks. Rheometer data were obtained using Model R-100 at 100 cycles/minute.

Table VII

| | Test Stock | | | | | |
|---|---|---|---|---|---|---|
| Components (parts) | a | b | c | d | e | f |
| Base Stock A | 162.5 | 162.5 | 162.5 | 162.5 | 162.5 | 162.5 |
| 2-(4-morpholinodithio) benzothiazole | 0.5 | 0.5 | 0.5 | 0.5 | 0.5 | 0.5 |
| Resorcinol | — | — | 1.0 | 1.0 | — | — |
| Hexamethylenetetramine | — | — | 1.0 | 1.0 | — | — |
| N,N'-bis(1-methylheptyl)-p-phenylenediamine | — | — | — | — | 1.0 | 1.0 |
| Ex. I sulfilimine | — | 0.6 | — | 0.6 | — | 0.6 |
| Rheometer at 135° C. | | | | | | |
| $t_4$ | 14.9 | 23.6 | 8.4 | 13.2 | 10.0 | 17.5 |
| $t_{90\%}$ | 51.0 | 62.3 | 44.0 | 57.5 | 41.0 | 51.0 |
| $(t_{90\%}-t_4)$ | 36.1 | 38.7 | 35.6 | 44.3 | 31.0 | 33.5 |
| $\Delta$Torque | 52.6 | 53.5 | 74.5 | 71.2 | 53.9 | 52.8 |

The above examples are not intended to be limiting, but rather illustrative. Any of the retarders, accelerators and rubbers described earlier herein can be substituted in the preceding examples to obtain retardation effects. In addition the levels of the retarders and other components in said examples could be altered in accordance with the general teachings herein and retardation effects would be obtained.

The retarders of this invention may be used at concentrations of from 0.10 part to 5.0 parts by weight of retarder per 100 parts by weight of rubber and even from 0.05 to 10.0 parts. Preferably the concentration ranges from 0.25 to 5.0 parts, more preferably from 0.25 to 3.0 parts and most preferably from 0.25 to 1.50 parts.

The retarders of the present invention are preferably added to the rubbery polymer at the same time that the accelerator is added, although this order of addition is not necessary to the successful utilization of the compounds of this invention.

The data in the preceding working examples are representative of the fact that the compounds of the present invention are effective as retarders in the presence of organic accelerators whether they are diaryl guanidines such as diphenylguanidine, or thiazoles, more specifically benzothiazyl amino disulfides, such as 2-(morpholinodithio)-benzothiazole, or thiazoles (also sulfenamides), more specifically thiazolesulfenamides, and even more specifically benzothiazolesulfenamides such as 2-(morpholinothio)-benzothiazole and N-cyclohexyl-2-bezothiazolesulfenamide, i.e., regardless of what type of organic accelerator is used. Thiuram sulfides such as tetramethyl thiuram monosulfide and disulfide and tetraethylthiuram monosulfide and disulfide may also be used as well as other benzothiazolesulfenamides such as N-(t-butyl)-2-benzothiazolesulfenamide.

Various organic accelerators useful within the practice of this invention are described and illustrated in the Vanderbilt Rubber Handbook, 1968Edition, R. T. Vanderbilt Company, Inc., particularly at pages 242 to 244 and also in the bulletin of the Elastomer Chemicals Dept. of the E. I. du Pont de Nemours and Co.(Inc.) entitled, "Accelerators, Vulcanizing Agents and Retarders, Brochure No. SD A54457."

The polymers in which the retarders of the present invention are incorporated remain suitable for their art recognizing uses, e.g., in tires and industrial products.

While certain representative embodiments and details have been shown for the purpose of illustrating the invention, it will be apparent to those skilled in this art that various changes and modifications may be made therein without departing from the spirit or scope of the invention.

What is claimed is:

1. A composition comprising a sulfur vulcanizable rubber containing in a retarding amount at least one retarder conforming to one of the following structural formulae:

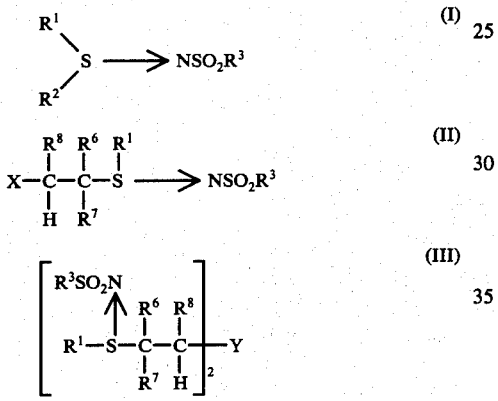

wherein $R^1$ and $R^3$ are selected from the group consisting of primary alkyl radicals (1-20 carbon atoms), secondary alkyl radicals (3-20 carbon atoms), tertiary alkyl radicals (4-20 carbon atoms), cycloalkyl radicals (5-20 carbon atoms), aralkyl radicals (7-20 carbon atoms), and aryl radicals (6-20 carbon atoms), said aralkyl and aryl radicals being optionally substituted on the ring by one or two alkyl (1-4 carbon atoms), alkoxy (1-4 carbon atoms), halo or nitro groups, wherein $R^2$ is selected from the group consisting of primary alkyl radicals (2-20 carbon atoms), secondary alkyl radicals (3-20 carbon atoms), tertiary alkyl radicals (4-20 carbon atoms) and cycloalkyl radicals (5-20 carbon atoms), wherein $R^5$ is selected from the group consisting of primary alkyl radicals (2-20 carbon atoms), secondary alkyl radicals (3-20 carbon atoms), and cycloalkyl radicals (5-20 carbon atoms), wherein $R^6$, $R^7$, and $R^8$ are selected from the group consisting of hydrogen and primary alkyl radicals (1-4 carbon atoms), wherein X is selected from the group consisting of —CN, —$CO_2R^3$, —$CO_2NH_2$, —$CO_2NHR^3$, —CO N($R^1$)$_2$, —C(O)$R^3$ and $SO_2R^3$, and wherein Y is selected from the group consisting of —C(O)— and —$SO_2$— radicals, with the proviso that in (II) and (III) when $R^1$ is a tertiary alkyl radical, $R^7$ is hydrogen.

2. The composition according to claim 1 wherein the rubber contains a sulfur vulcanization agent.

3. The composition according to claim 2 wherein the rubber contains an organic vulcanization accelerating agent selected from the group consisting of thiazoles, diaryl guanidines and thiuramsulfides.

4. The composition according to claim 1 wherein $R^1$ is selected from the group consisting of primary alkyl radicals (2-13 carbon atoms), secondary alkyl radicals (3-12 carbon atoms), cyclohexyl and phenyl, wherein $R^2$ is selected from the group consisting of secondary alkyl radicals (3-12 carbon atoms), tertiary alkyl radicals (4-12 carbon atoms) and cyclohexyl, wherein $R^3$ is selected from the group consisting of primary alkyl radicals (1-12 carbon atoms), secondary alkyl radicals (3-12 carbon atoms), tertiary alkyl radicals (4-12 carbon atoms), cyclohexyl, phenyl, p-chlorophenyl, p-tolyl, and p-nitrophenyl and wherein $R^6$, $R^7$, and $R^8$ are hydrogen, and wherein X is —CN, —$CO_2CH_3$ or —$CO_2CH_2CH_3$ and wherein Y is —$SO_2$—.

5. The composition according to claim 1 wherein the retarder is selected from the group consisting of
S,S-di(isopropyl)-N-(p-toluenesulfonyl) sulfilimine;
S,S-di(isopropyl)-N-(benzenesulfonyl) sulfilimine;
S-isopropyl-S-(2-carbomethoxyethyl)-N-(p-toluene sulfonyl) sulfilimine;
S-isopropyl-S-(2-carbomethoxyethyl)-N-(benzenesulfonyl) sulfilimine;
S-cyclohexyl-S-(2-carbomethoxyethyl)-N-(p-toluenesulfonyl) sulfilimine; and
S-cyclohexyl-S-(2-carbomethoxyethyl)-N-(benzenesulfonyl) sulfilimine.

6. The composition according to claim 1 wherein the retarder is present in the amount of from 0.1 to 5.0 parts by weight per 100 parts by weight of rubber.

7. A compound conforming to one of the following structural formulae:

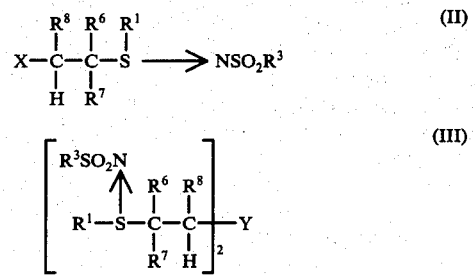

wherein $R^1$ and $R^3$ are selected from the group consisting of primary alkyl radicals (1-20 carbon atoms), secondary alkyl radicals (3-20 carbon atoms), tertiary alkyl radicals (4-20 carbon atoms), cycloalkyl radicals (5-20 carbon atoms), aralkyl radicals (7-20 carbon atoms), and aryl radicals (6-20 carbon atoms), said aralkyl and aryl radicals being optionally substituted on the ring by one or two alkyl (1-4 carbon atoms), alkoxy (1-4 carbon atoms), halo or nitro groups wherein $R^6$, $R^7$ and $R^8$ are selected from the group consisting of hydrogen and primary alkyl radicals (1-4 carbon atoms), wherein X is selected from the group consisting of —CN, —$CO_2R^3$, —$CO_2NH_2$, —$CO_2NHR^3$, —$CO_2N(R^1)_2$, —C(O)$R^3$ and $SO_2R^3$, and wherein Y is selected from the group consisting of —C(O)— and —$SO_2$— radicals with the proviso that when $R^1$ is a tertiary alkyl radical, $R^7$ is hydrogen.

* * * * *